United States Patent [19]

Peterson et al.

[11] 3,869,418
[45] Mar. 4, 1975

[54] CARBOXYLATED GRAFT COPOLYMER AND EMULSION CONTAINING SAME

[75] Inventors: William R. Peterson; Walter N. Johnson, both of Chattanooga, Tenn.

[73] Assignee: GAF Corporation, New York, N.Y.

[22] Filed: June 15, 1973

[21] Appl. No.: 370,420

Related U.S. Application Data

[63] Continuation of Ser. No. 171,006, Aug. 11, 1971, abandoned.

[52] U.S. Cl.. 260/29.7 T, 260/29.7 UP, 260/857 G, 260/875, 260/879, 260/880, 260/886
[51] Int. Cl. ....... C08d 1/09, C08d 3/02, C08f 7/14, C08f 19/06
[58] Field of Search .......... 260/875, 879, 880, 886, 260/857 G, 29.7, UP, 29.7 T

[56] References Cited
UNITED STATES PATENTS
3,352,808  11/1967  Leibowitz et al. ................. 260/879
3,431,227  3/1969  Kastning et al. ............. 260/29.7 UP Primary Examiner—Morris Liebman
Assistant Examiner—T. DeBenedictis, Sr.
Attorney, Agent, or Firm—Walter C. Kehm; Samson B. Leavitt; James N. Blauvelt

[57]  ABSTRACT

A graft copolymer of a monomer including at least one monomeric unsaturated aliphatic carboxylic acid and at least one additional monomer selected from the group consisting of aliphatic conjugated dienes and monoalkenyl aromatic compounds polymerized on a polymeric N-vinyl lactam substrate, stable aqueous emulsions containing same, and methods for producing such emulsions and graft copolymers useful as adhesives and other purposes.

14 Claims, No Drawings

CARBOXYLATED GRAFT COPOLYMER AND EMULSION CONTAINING SAME

This is a continuation of application Ser. No. 171,006, filed Aug. 11, 1971 and now abandoned.

BACKGROUND OF THE INVENTION

This invention relates to novel graft copolymers of a monomeric mixture including at least one unsaturated aliphatic carboxylic acid and at least one other monomer selected from the group consisting of aliphatic conjugated dienes and monoalkenyl aromatic compounds polymerized on a polymeric N-vinyl lactam substrate and a process for their production and to stable aqueous emulsions containing such graft copolymers and the process for producing such emulsions.

It is well known that N-vinyl lactam monomers can be polymerized with other monomers but it has not been possible to successfully produce copolymers of the above monomeric mixture with N-vinyl lactams.

Attempts to prepare such a copolymer have heretofore led to the formation of a copolymer containing very little N-vinyl lactam. If the copolymerization is carried out in an aqueous system it will generally yield mixtures of water soluble and insoluble copolymers, or mixtures of homopolymers and their unstable emulsions. Apparently, the monomeric N-vinyl lactam would not cooperate to any appreciable extent.

SUMMARY OF THE INVENTION

It is an object of the present invention to provide a novel graft copolymer which is not subject to one or more drawbacks of the prior art.

It is another object of the present invention to provide a stable aqueous emulsion containing the graft copolymer of the invention which emulsion is not subject to one or more drawbacks of the prior art.

It is still another object of the present invention to provide a process for making both the novel stable aqueous emulsion and recovering the novel graft copolymer therefrom.

It is yet a further object of the present invention to provide for the production of the foregoing with existing facilities without additional capital expenditure.

Further objects and advantages of the invention will be set forth in the following specification and in fact, will be obvious therefrom without being specifically referred to.

It has now been found that polymeric N-vinyl lactam will successfully function as a substrate in the production of carboxylated open chain aliphatic conjugated diene-monoalkenyl aromatic interpolymers as well as add to the stability of the aqueous emulsion.

The attainment of the above objects is thus made possible by the present invention which includes the provision of a stable aqueous emulsion containing a graft copolymer of a monomer mixture including at least one monomeric unsaturated aliphatic carboxylic acid and at least one monomer selected from the group consisting of aliphatic conjugated dienes and monoalkenyl aromatic compounds polymerized on a polymeric N-vinyl lactam substrate.

The stable aqueous emulsions of this invention have surprisingly improved properties with respect to stability, low viscosity, film clarity, and the like. Extraction, solubility, and film clarity tests indicate that, in these emulsions, the graft polymeric product is in a high degree of interpolymerization or copolymerization and contains a minimum amount of homopolymer or free polymeric N-vinyl lactam. The resulting emulsions and graft copolymers therein can be compounded with a wide variety of additives such as salts, pigments, protective colloids, wetting agents, plasticizers, resins, waxes and the like to obtain a wide range of products for use in all fields in which polymeric emulsions are now used as in the paint, coatings, adhesives, polishes, textile and rubber fields. They have particularly good properties for use as a tire cord adhesive in laminating tire cord to rubber. In particular, the lamination of nylon tire cord to rubber is a difficult lamination, and the novel interpolymer of this invention has outstanding properties as an adhesive base for this lamination.

N-vinyl lactams and water soluble polymers thereof, and methods for their production are well known in the art. Thus, for example, U.S. Pat. No. 2,317,804 discloses a suitable method for preparing N-vinyl lactams and U.S. Pat. Nos. 2,215,450, 2,335,454 and 3,352,808 disclose methods for preparing water soluble polymers thereof and aqueous solutions containing the same. As examples of N-vinyl lactams which may be employed, in producing in a known manner the operative aqueous solutions of water soluble homopolymers thereof, there may be mentioned the N-vinyl derivatives of gamma-, delta-, and epsilon-lactams (N-vinyl derivatives of the cyclic amides of gamma-, delta-, and epsilon aminocarboxylic acids of the aliphatic series), and lower alkyl (methyl, ethyl) substituted derivatives of such N-vinyl lactams. Among this group, N-vinyl-2-pyrrolidone (otherwise referred to as 1-vinyl-2-pyrrolidone, N-vinyl-α-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl-3,3,-dimethyl-2-pyrrolidone and the like. Other N-vinyl lactams which may be employed include N-vinyl-hexahydrophthalamidine, N-vinyl-naphthostyrile, etc. Depending upon the extent of polymerization these polymeric N-vinyl lactams may have molecular weights ranging from at least 400 up to 2 million or more. The Fikentscher K-value as described for example, in Schildknecht, "Vinyl and Related Polymers," John Wiley & Sons, Inc., New York, 1952 (page 676) is a convenient designation of relative degrees of polymerization or relative molecular weights. Generally, there may be employed those polymeric N-vinyl lactams having a K-value of about 5 to 90 and preferably about 15 to 30, and mixtures thereof.

The polymerization catalysts, such as a free radical supplying redox catalyst, useful in the present process are well known in the art. Most of these catalysts are compounds yielding oxygen under the usual conditions of polymerization, and are represented by the inorganic and organic peroxygen or peroxide compounds. As examples of such compounds, there may be mentioned hydrogen peroxide, metal and alkali metal peroxides such as sodium, potassium, barium and zinc peroxide, diacyl peroxides such as diacetyl, dibenzoyl and dilauroyl peroxide, dialkyl peroxides such as di-tertiary-butyl peroxide and cyclohexene peroxide, hydroperoxides such as tertiary-butyl hydroperoxide and p-methane hydroperoxide, peroxygen acids such as performic, persulfuric and peracetic acid and their ammonium, sodium and potassium salts, in addition to systems such as potassium or ammonium persulfate-sodium bisulfite and the like. Other oxygen-yielding compounds or sources include atmospheric oxygen, ozone and the like.

Azo type catalysts, i.e., compounds containing the azo linkage, may also be employed. As example of such catalysts there may be mentioned $\alpha,\alpha'$-azobis-($\alpha,\gamma$-dimethyl-valeronitrile),$\alpha,\alpha'$-azobis-($\alpha$-methyl butyronitrile),$\alpha,\alpha'$-azobis-($\alpha$-ethyl butyronitrile),$\alpha,\alpha'$-azodiisobutyramide, dimethyl and diethyl,$\alpha,\alpha'$-azodiisobutyrate, and the like.

The preferred catalysts effective for the production of optimum results with respect to a minimum of homopolymer and maximum emulsion stability and film clarity are the water soluble organic and inorganic peroxygen compounds referred to above, which are preferably employed along with an activator. Some typical activators are amines, meta-bisulfites, ascorbic acid, Fe salts and other activators which are well known to those skilled in the art.

By the term "monoalkenyl aromatic monomer" it is intended to include those monomers wherein an alkenyl group is attached directly to an aromatic nucleus containing from about 6 to about 10 carbon atoms. Those monomers may include alkyl, alkoxy and/or halo substituted compounds. Typical of these monomers are styrene, p-methyl styrene, o-methyl styrene, o-p-dimethyl styrene, o-p-diethyl styrene, p-chlorostyrene, isopropyl styrene, tert-butyl styrene, o-methyl-p-isopropyl styrene, $\alpha$ and $\beta$ bromovinyl benzene, $\alpha$ and $\beta$ chlorovinyl benzene, o-m or p-methoxy benzenes, and o-p-dichlorostyrene and the like and any mixtures thereof. The term is also intended to include vinyl naphthalenes, which naphthalenes may be used alone or in mixtures thereof or in combination with the styrene monomers or mixture of styrenes. Because of its availability and ability to produce desirable polymers and for other reasons, it is preferred to use styrene as the monoalkenyl aromatic monomer.

By the term "open chain aliphatic conjugated diene" it is meant to include typically, butadiene-1,3; 2-methyl-1,3-butadiene-(isoprene); 2,3-dimethyl butadiene-1,3; piperylene; 2-neopentylbutadiene-1,3 and other hydrogen homologs of butadiene-1,3 and in addition, the substituted dienes, such as 2-chloro-1,3-butadiene (chloroprene); 2-cyano-butadiene-1,3 the substituted straight chain conjugated pentadienes, the straight-and-branch-chain hexadienes, and the like and any mixtures thereof. The butadiene-1,3 hydrocarbons, because of their ability to produce particularly desirable polymeric materials, are preferred comonomers for use with the monoalkenyl aromatic monomer. The ethylene unsaturation in the above copolymerizable monomers is preferably alpha, beta-unsaturation, though it need not be.

The unsaturated aliphatic carboxylic acids, such as, but not limited to, monoethylenically unsaturated aliphatic monocarboxylic acids, include any of those copolymerizable with the aforementioned monomers. Combination of two or more such acids are equally operable in this invention. The carboxylic acid may be added in its free acid form or in a partially neutralized form, or may be converted, at least in part, to a salt while in an aqueous dispersion. Exemplary ethylenically unsaturated aliphatic monocarboxylic acids, include crotonic acid, $\alpha$-chloro-crotonic acid, isocrotonic, cis-2-butenoic acid, hydrosorbic acid, acrylic acid, $\alpha$-chloroacrylic acid, methacrylic acid, ethacrylic acid, vinylthiophenic acid, vinyl furylacrylic acid, vinyl furoic acid, $\alpha$-methyl sorbic acid, $\alpha$-ethyl sorbic acid, $\alpha$-chloro sorbic acid, $\alpha$-bromo-sorbic acid, $\beta$chloro sorbic acid, $\alpha$-$\beta$-gamma-epsilon-dimethyl sorbic acid, $\alpha$-and-$\beta$-vinyl acrylic acids and the like.

There may also be used one or more ethylenically unsaturated polycarboxylic acids containing an activated olefinic double bond which readily functions in an addition polymerization reaction because it is present in the monomer molecule either in the d,b position with respect to a strongly polar or functional group, such as carboxyl or others which are well known as activating groups or because it is adjacent to a terminal methylene group,

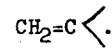

In general, the typically suitable polycarboxylic acids may be represented by the following formula:

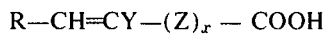

in which R is preferably hydrogen or carboxyl, but may be carboxylic ester, alkyl or alkenyl, Y is hydrogen, carboxyl, halogen, cyano, sulfo, alkyl, aryl, thienyl, or furyl, Z is methylene or a substituted methylene group or an allyl, arylene, thienylene or furylene divalent radical, $x$ is zero or any whole number, suitably not exceeding 3, and in which at least one of the groups R and Y is carboxyl-containing.

For example, such ethylenically unsaturated polycarboxylic acids include fumaric, maleic, citraconic, mesaconic, itaconic, teraconic, aconitic, ethyl maleic acid, methyl itaconic, muconic, hydromuconic, glutaconic, 3-carboxypentadiene-(2,4)-oic-1, $\beta$-(p-carboxyphenyl) acrylic, 2,4-pentadiendioic-1,3 acid, the dimer and trimer of methacrylic acid and other monolefinic and polyolefinic polycarboxylic acids. The utilization of these copolymerizable poly-basic acids or their anhydrides, which are readily hydrolyzed in the acidic polymerization, provides a means for direct introduction of the polycarboxylic acid groups into the polymer chain.

It is be understood that the polymerization heretofore described is conducted under such conditions that the monomeric components are individually or in any combinations thereof graft polymerized as side chains on the polymeric N-vinyl lactam substrate, without any substantial concurrent homopolymerization of such monomeric components.

If the polymerization reaction is allowed to proceed to approximately 100 percent completion, then the ratios of the monomers charged represent the ratio of the polymerized constituents in the polymer chain. By acidic copolymer is meant a copolymer containing carboxyl groups on the polymer chain.

The composition of the carboxylated graft copolymer can be varied by:
1. Varying the ratio of polymeric N-vinyl lactam to the ratio of respective monomers;
2. Using different combinations of the different types of monomers;
3. Varying the ratio of the different types of monomers;
4. Using different monomers of the same type;
5. Varying the amounts of the same type of monomers; and
6. By combining 1 to 5 of the above.

The emulsions produced in accordance with this invention are characterized by unusually good stability, low to medium viscosities at low pH, generally below about 2,500 cps (centiposes, Brookfield Viscosimeter), the ability to deposit a clear transparent film on a glass plate, and a graft copolymer product which is substantially insoluble in water and in most hydrocarbon solvents, though it will swell in the latter.

If desired, the graft copolymer may be separated from the stable aqueous emulsion, notwithstanding the desirable properties of the emulsion as a latex. The separation may be accomplished by drying, i.e., air, spray or flash drying, or stripping or other generally accepted procedures known in the art. The viscosity of the latex is largely dependent on the amount of polymeric N-vinyl lactam present, the initial molecular weight of said lactam and the pH.

It will be understood that in carrying out the process of this invention, known surface active agents, protective colloids, plasticizers, thickeners, chain transfer agents and other additives may be added prior to or during polymerization or after the polymerization reaction is completed. Anionic or nonionic emulsifying agents may be employed although a mixture of anionic and nonionic agents is preferred. As examples of nonionic agents which may be employed, there may be mentioned the condensation products of a plurality of moles of ethylene oxide with organic compounds containing at least 8 carbon atoms and a reactive hydrogen atom such as the water insoluble carboxylic and sulfonic acids, alcohols, thiols, phenols, hydroxy carboxylic acids, carboxy and sulfonic acids and amides, primary and secondary amines, hydroxyalklamines, as disclosed, for example, in U.S. Pat. Nos. 1,970,578, 2,205,021, 2,085,706, 2,002,613, 2,266,141, 2,677,700, 2,213,477, 2,593,112, 2,454,542–545, and 2,174,761. As specific examples of such nonionic agents there may be mentioned the reaction products of 1 mole of nonylphenol with 9 to 100 E.O. (moles ethylene oxide), 1 mole of castor oil with 20 E.O., 1 mole tall oil with 18 E.O., 1 mole of oleyl alcohol with 20 E.O., 1 mole of dodecyl mercaptan with 9 E.O., 1 mole of soybean oil amine with 10 E.O., 1 mole of rosin amine with 32 E.O., 1 mole of cocoanut fatty acid amine with 7 E.O., 1 mole of dinonyl phenol with 15 E.O., 1 mole of oxo tridecyl alcohol with 12 E.O., Pluronic L62 and the like.

Suitable anionic surface active agents include the sulfonic acids, sulfate esters, and phosphate esters (particularly the primary and secondary phosphate esters and mixtures thereof of the above mentioned nonionic surface active agents as disclosed, for example, in U.S. Pat. Nos. 3,004,056 and 3,004,057) and salts and mixtures thereof. Other such anionic surface active agents include alkylaryl sulfonic acids such as dodecylbenzene sulfonic acid, alkyl sulfates such as laurylsulfate, sodium N-methyl taurides of higher ($C_{10}$ to $C_{20}$) fatty acids as disclosed, for example, in U.S. Pat. Nos. 1,932,180, 3,013,035, 3,013,036 and 3,057,889, isethionates such as sodium N-methyl isethionates esters of higher ($C_{10}$ to $C_{20}$) fatty acids as disclosed, for example, in U.S. Pat. Nos. 2,923,724 and 3,004,049.

Protective colloids and/or thickening agents may also be employed if desired such as polyvinyl alcohol, copolymers such as the copolymer of vinyl methyl ether and maleic anhydride, hydroxyethyl cellulose, carboxymethyl cellulose, natural gums and colloidal materials and the like. Viscosities of up to 80,000 cps or more may thereby be obtained when required.

A DETAILED DESCRIPTION OF THE INVENTION

For a fuller understanding of the nature and objects of the invention, reference should be had to the following detailed description, taken in connection with the following examples, which are not to be considered as limiting, but rather illustrative of the present invention. All parts and proportions referred to herein and in the appended claims are by weight unless otherwise indicated.

In carrying out the polymerization reaction, the emulsifying agent, catalyst, charge water, unsaturated aliphatic carboxylic acid and polymeric N-vinyl lactam are preferably admixed in any order in increments or otherwise, with the remaining monomer mixture referred to above. For better temperature control and production of a product with optimum properties it is, however, preferred to add said remaining monomer mixture gradually and/or in increments to the aqueous solution of polymeric N-vinyl lactam and remaining components. It is preferred to carry out the reaction at a temperature range of from about 45°C to about 105°C, preferably from about 65°C to about 75°C, and under sufficient pressure to maintain the conjugated diene liquid. The pH of the medium is substantially non-critical, though a pH of below 7 and preferably between 2 and 6 is preferred. Completion of the reaction is determined by cessation of evolution of heat and/or spot analysis for solids content and the like.

The polymerization reaction is substantially quantitative in that a stable aqueous emulsion is produced containing a graft copolymer of the carboxylated conjugated diene-monoalkenyl aromatic monomers graft polymerized on the polymeric N-vinyl lactam substrate in the dispersed phase, with little or no polymeric product dissolved in the continuous aqueous phase.

The weight ratio of polymeric N-vinyl lactam to the total monomeric mixture can be varied from about 1:99 to about 20:80; and the weight ratio of monoalkenyl aromatic monomer, when employed, to conjugated diene can vary from about 5:95 to about 75:25, the preferred range being about 25:75 to about 75:25. The unsaturated aliphatic carboxylic acid can be employed in proportions of about 0.5 to about 20 parts and preferably about 2 to about 6 parts by weight per 100 parts of total monomeric mixture. The amount of catalyst should preferably be about 0.05 percent to about 5.0 percent by weight based on the monomeric mixture.

Some typical catalysts are persulfate salts, peroxides, hydroperoxide and other peroxy compounds. The polymerization reaction may be carried out at 20–55 percent solids content, though it is preferred to conduct same at 38–46 percent solids. The emulsion can be further concentrated to 96 percent, if desired, after the polymerization, in accordance with standard techniques.

EXAMPLE I

To a 2-liter, stirred autoclave there is added:
  675 grams distilled water
  23 grams of 70 percent nonylphenoxy poly(ethylene oxy) ethanol
  60 grams of 40 percent sodium dodecyl benzene sulfonate
  14 grams potassium persulfate 7.5 grams (1.0 parts) acrylic acid
7.5 grams (1.0 parts) methacrylic acid
60 grams (8.0 parts) polyvinyl pyrrolidone (PVP) (K-value=30)

The reactor is turned on and thereafter a mixture of 418 grams (58 parts) styrene and 288 grams (40 parts) butadiene are added.

The reactor is heated to 75°C for 18 hours, and the product is cooled and discharged. The percent solids is 50.5 percent, indicating substantially complete conversion of monomer to polymer. The polymeric latex emulsion is stable. After being neutralized to a pH of 7.0 through use of ammonia, cast onto a glass plate and cured for 12 minutes at 135°C, a clear, water insoluble film with improved adhesion and tensile strength is obtained.

EXAMPLE II

The procedure of Example I is repeated, except that the PVP of Example I is replaced by 60 grams (8 parts) of PVP having a K-value of 14. The same good results are obtained.

EXAMPLE III

The procedure of Example I is repeated, except that 120 grams (16 parts) of the same PVP is used. The same good results are obtained.

EXAMPLE IV

The procedure of Example I is repeated, except that 45 grams (6 parts) of PVP having a K-value of 60 is used instead of the 60 grams of K-value=30 material. The same good results are obtained.

EXAMPLE V

The procedure of Example I is repeated, except that 30 grams (4 parts) of PVP having a K-value of 90 is used. Similar results are obtained.

EXAMPLE VI

The procedure of Example I is repeated, except that the PVP is post-added to a finished latex produced from the remaining materials instead of being charged initially. The properties of the resulting latex are inferior as shown in the following table.

TABLE A

|  | EXAMPLE I | EXAMPLE VI |
| --- | --- | --- |
| Film Clarity | Bright; clear | Dull; opaque |
| Film Strength | Strong; good Elongation | Weak with poor elongation |
| Film adhesion | Excellent | Poor |
| Film Water Resistance | Good | Poor; re-emulsified |
| Emulsion Viscosity (Brookfield 20 rpm; No. 6 spindle | 780 cps No. 2 at 20 rpm pH 9.0 | 13,250 cps No. 6 at 20 rpm pH 9.2 |
| Stability | Good | Poor |

EXAMPLE VII

The procedure of Example I is repeated, except that the theoretical polymeric latex solids content is lowered to 40 percent by increasing the amount of charge water, and the individual monomers, PVP K-30 and their amounts varied as shown in the following Table B.

TABLE B

| | | | PARTS | | |
| --- | --- | --- | --- | --- | --- |
| Isoprene | Chloroprene | Styrene | Butadiene | Mixed Acrylic Acid & Methacrylic Acid | PVP-K-30 |
| 0 | 0 | 48 | 50 | 2 | 6 |
| 0 | 48 | 0 | 50 | 2 | 6 |
| 48 | 0 | 0 | 50 | 2 | 6 |
| 0 | 50 | 48 | 0 | 2 | 6 |
| 50 | 0 | 48 | 0 | 2 | 6 |
| 0 | 0 | 28 | 70 | 2 | 6 |
| 0 | 70 | 28 | 0 | 2 | 6 |
| 70 | 0 | 28 | 0 | 2 | 6 |
| 0 | 28 | 0 | 70 | 2 | 6 |
| 28 | 0 | 0 | 70 | 2 | 6 |
| 0 | 0 | 0 | 98 | 2 | 6 |
| 0 | 98 | 0 | 0 | 2 | 6 |
| 98 | 0 | 0 | 0 | 2 | 6 |
| 0 | 0 | 67 | 31 | 2 | 6 |
| 0 | 31 | 67 | 0 | 2 | 6 |
| 31 | 0 | 67 | 0 | 2 | 6 |
| 0 | 67 | 0 | 31 | 2 | 6 |
| 67 | 0 | 0 | 31 | 2 | 6 |
| 0 | 0 | 75 | 23 | 2 | 6 |
| 0 | 23 | 75 | 0 | 2 | 6 |
| 23 | 0 | 75 | 0 | 2 | 6 |
| 0 | 75 | 0 | 23 | 2 | 6 |
| 75 | 0 | 0 | 23 | 2 | 6 |
| 0 | 0 | 48 | 50 | 2 | 8 |
| 0 | 48 | 0 | 50 | 2 | 8 |
| 48 | 0 | 0 | 50 | 2 | 8 |
| 0 | 50 | 48 | 0 | 2 | 8 |
| 50 | 0 | 48 | 0 | 2 | 8 |
| 0 | 0 | 48 | 50 | 2 | 12 |
| 0 | 48 | 0 | 50 | 2 | 12 |
| 48 | 0 | 0 | 50 | 2 | 12 |
| 0 | 50 | 48 | 0 | 2 | 12 |
| 50 | 0 | 48 | 0 | 2 | 12 |
| 0 | 0 | 48 | 50 | 2 | 16 |
| 0 | 48 | 0 | 50 | 2 | 16 |
| 48 | 0 | 0 | 50 | 2 | 16 |
| 0 | 50 | 48 | 0 | 2 | 16 |
| 50 | 0 | 48 | 0 | 2 | 16 |
| 0 | 0 | 48 | 50 | 2 | 18 |
| 0 | 48 | 0 | 50 | 2 | 18 |
| 48 | 0 | 0 | 50 | 2 | 18 |
| 0 | 50 | 48 | 0 | 2 | 18 |
| 50 | 0 | 48 | 0 | 2 | 18 |

In all cases, stable emulsions are obtained which when cast and cured form good continuous films.

EXAMPLE VIII

The procedure of Example I is followed, except that the solids content is similarly reduced to 40 percent and the unsaturated aliphatic carboxylic acids are varied as follows:

| | | |
|---|---|---|
| a) | 2 parts | Fumaric Acid |
| b) | 2 parts | Itaconic Acid |
| c) | 2 parts | Fumaric Acid |
| | 2 parts | Itaconic Acid (reducing styrene by 2 parts) |
| d) | 3 parts | Itaconic Acid |
| | 2 parts | Methacrylic Acid (reducing styrene by 3 parts) |
| e) | 6 parts | Acrylic Acid (reducing styrene by 4 parts) |

The novel copolymers of the present invention, either dried or in the form of the latices in which they are obtained, are suitable for a wide variety of uses in the art. They are unusually stable to intense mechanical shear, freeze-thaw cycling and the addition of electrolytes such as mineral acids, polyvalent metal salts and the like. They can be compounded with a wide variety of additives such as pigments, clays, salts, protective colloids, wetting agents, plasticizers, resins, waxes, etc., in order to obtain a wide range of products for use in all fields in which emulsion polymers are now used. They are compatible with many other commercial latices and tolerate pigment and filler loading. They can be used in a wide variety of adhesive applications particularly for laminating together similar or dissimilar materials, such as for bonding synthetic plastics to fabrics of natural or synthetic origin in the application of polyurethane to fabrics, and other adhesive sizing and coating applications, and particularly with paper, leather and textiles. These novel latices, either alone or compounded with other resins, or latices, form films which set up rapidly and adhere well to a number of polar and non-polar surfaces. In wet bonding of porous surfaces, penetration is uniform so that film thickness on the surface can be readily met by compounding with plasticizers, borates, solvents, pigments, and thickeners or other modifying resins or latices. Among the types of surfaces on which they can be used, either as coatings or as adhesives between two similar or dissimilar surfaces are paper, glass, natural and synthetic fibers, wood, aluminum foil, steel, leather and the like. In paper applications, these novel latices are useful as a pigment binder for Georgia clay, $TiO_2$ and $CaCO_3$. Where applied to porous materials they impart improved oil and grease resistance, light stability, improved dye-ability and printing and have good adhesion to paper and a variety of natural and synthetic fabrics. The films from these novel latices have good affinity for vat, sulfur, acid, disperse and direct dyes and their application as a surface coating or sizing to a variety of fabrics, particularly synthetic fabrics and films, improves the dyeability thereof and imparts antistatic properties. The films produced from the novel latices of the present invention can be applied and cured by heating (preferably from 120° to 205°C) in order to effect cross linking. Various curing aids can be used in this case, such as aminoplast resins, metal oxides, free radical sources including rubber vulcanizing agents and the like.

The novel latices of the present invention are also useful as opacifying agents for liquid detergent compositions in amounts as low as from 1 to 2 parts by weight of the latex per 100 parts of liquid detergent formulation.

The novel latices of the present invention have been found to be compatible with such commerical latices as those of butadiene-acrylonitrile latices, polyvinyl acetate copolymers, styrene-butadiene emulsions, vinyl acetate and vinyl stearate copolymers, styrene emulsions, alkyd and acrylate emulsions or latices, and with such naturally occurring products as dextrin or starch. In the latter application, the novel latices of the present invention may be used in starch or dextrin adhesive compositions. They are also compatible with other latices obtained by polymerization of vinyl monomers such as styrene or acrylic esters with polyvinyl pyrrolidone such as those described in U.S. Pat. Nos. 3,244,657 and 3,244,658.

We wish it to be understood that we do not desire to be limited to the exact details shown and described, for obvious modifications will occur to a person skilled in the art.

Having thus described the invention, what we claim as new and desired to be secured by Letters Patent, is as follows:

1. A stable aqueous emulsion comprising an emulsion polymerized graft polymer, comprising a polymeric N-vinyl lactam substrate and at least one monomeric olefinically unsaturated aliphatic carboxylic acid and at least one monomer selected from the group consisting of aliphatic conjugated dienes and monoalkenyl aromatic compounds, graft polymerized thereon, the weight ratio of polymeric N-vinyl lactam to the total monomeric mixture varying from about 1:99 to about 20:80, the weight ratio of monoalkenyl aromatic monomer to conjugated diene varying from about 5:95 to about 75:25, and the unsaturated aliphatic carboxylic acid is employed in proportions of about 0.5 to about 20 parts by weight per 100 parts of total monomeric mixture.

2. A process for producing a stable aqueous emulsion as defined in claim 1 comprising subjecting said monomer mixture in an aqueous solution of said polymeric N-vinyl lactam to polymerization conditions in the presence of a water soluble emulsifying agent and a free radical supplying polymerization catalyst.

3. A process for producing a graft copolymer as defined in claim 1 comprising subjecting said monomer mixture in an aqueous solution of said polymeric N-vinyl lactam to polymerization conditions in the presence of a water soluble emulsifying agent and a free radical supplying polymerization catalyst followed by the additional step of separating from the resulting emulsion the graft copolymer contained therein.

4. A stable aqueous emulsion as defined in claim 1 wherein said aliphatic conjugated diene is selected from the group consisting of 1,3-butadiene, 2-methyl-1,3-butadiene, 2,3-dimethyl-1,3-butadiene and 2-chloro-1,3-butadiene.

5. A stable aqueous emulsion as defined in claim 4 wherein said diene is 1,3-butadiene.

6. A stable aqueous emulsion as defined in claim 4 wherein said diene is 2-methyl-1,3-butadiene.

7. A stable aqueous emulsion as defined in claim 4 wherein said diene is 2,3-dimethyl-1,3-butadiene.

8. A stable aqueous emulsion as defined in claim 4 wherein said diene is 2-chloro-1,3-butadiene.

9. A stable aqueous emulsion as defined in claim 1 wherein said monoalkenyl aromatic compound is styrene.

10. A stable aqueous emulsion as defined in claim 1 wherein said olefinically unsaturated aliphatic carboxylic acid is selected from the group consisting of acrylic-, methacrylic-, fumaric and itaconic acids.

11. A stable aqueous emulsion as defined in claim 10 wherein said acid is acrylic acid.

12. A stable aqueous emulsion as defined in claim 10 wherein said acid is methacrylic acid.

13. A stable aqueous emulsion as defined in claim 10 wherein said acid is fumaric acid.

14. A stable aqueous emulsion as defined in claim 10 wherein said acid is itaconic acid.

* * * * *